US00RE47185E

(19) United States
(12) Reissued Patent
Ishizawa et al.

(10) Patent Number: US RE47,185 E
(45) Date of Reissued Patent: Jan. 1, 2019

(54) INK JET RECORDING APPARATUS

(71) Applicant: SEIKO EPSON CORPORATION, Tokyo (JP)

(72) Inventors: Taku Ishizawa, Shiojiri (JP); Yoshiaki Shimizu, Matsumoto (JP)

(73) Assignee: SEIKO EPSON CORPORATION, Tokyo (JP)

(21) Appl. No.: 15/040,467

(22) Filed: Feb. 10, 2016

Related U.S. Patent Documents

Reissue of:
(64) Patent No.: 8,646,885
Issued: Feb. 11, 2014
Appl. No.: 13/080,600
Filed: Apr. 5, 2011

(30) Foreign Application Priority Data

Aug. 31, 2010 (JP) ..... 2010-193526

(51) Int. Cl.
*B41J 2/175* (2006.01)
*B41J 29/02* (2006.01)

(52) U.S. Cl.
CPC ..... *B41J 29/02* (2013.01); *B41J 2/175* (2013.01)

(58) Field of Classification Search
CPC ..... B41J 29/02; B41J 2/175
USPC ..... 347/85
See application file for complete search history.

(56) References Cited

U.S. PATENT DOCUMENTS 5,469,201 A * 11/1995 Erickson et al. ..... 347/85
6,003,981 A * 12/1999 Cameron ..... B41J 2/175 347/85
6,789,882 B2 * 9/2004 Hiramatsu et al. ..... 347/84
7,175,265 B2 * 2/2007 Tsuyama et al. ..... 347/85
7,216,964 B2 * 5/2007 Holland et al. ..... 347/87
2005/0174408 A1 8/2005 Qingguo et al.
(Continued)

FOREIGN PATENT DOCUMENTS

JP 2005-219483 8/2005
JP 2006-231837 9/2006
JP 2006231837 A * 9/2006
(Continued)

*Primary Examiner* — Minh Nguyen
(74) *Attorney, Agent, or Firm* — Workman Nydegger

(57) ABSTRACT

[A tube support member that puts a tube connected to an ink jet head and an ink tank in a bent state is provided. Accordingly, when a pulling force acts between the bent support member and the tube, a component force acting as contact force occurs at the surface that makes contact with the tube, and a high degree of friction is generated in response to this component force. The tube is thus strongly supported in a state in which the tube does not shift with the dimensions of the tube changing. Meanwhile, when the pulling force is released, the component force is also eliminated, and the tube is freed; the dimensions of the tube return to normal, and the tension is eliminated.] *An ink jet recording apparatus that prints using an ink jet head is provided. The apparatus includes an ink tube that is connected to the ink jet head and an ink tank that is provided separately from the main body of the apparatus. The apparatus includes a tube support member that supports the ink tube. The tube support member includes a first tube support member that forms a tube guide and a second tube support member that is located at a side of the ink tank.*

17 Claims, 11 Drawing Sheets

(56) References Cited

U.S. PATENT DOCUMENTS

2006/0256170 A1 11/2006 Kobayashi et al.

FOREIGN PATENT DOCUMENTS

| | | | |
|---|---|---|---|
| JP | 2006-305942 | | 11/2006 |
| JP | 2007-144905 | | 6/2007 |
| JP | 2007144905 A | * | 6/2007 |

* cited by examiner

INK JET RECORDING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a Reissue application of U.S. patent application Ser. No. 13/080,600, filed Apr. 5, 2011, now U.S. Pat. No. 8,646,885, which issued on Feb. 11, 2014 and claims priority to Japanese Patent Application No. 2012-0050416.*

The entire disclosure of Japanese Patent Application No. 2010-193526, filed Aug. 31, 2010 is expressly incorporated by reference herein.

BACKGROUND

1. Technical Field

The present invention relates to an ink jet recording apparatus that, when a pulling force has acted in the extension direction of a tube whose extension direction from a support location is regulated within a predetermined angular range, supports the tube so as to prevent the tube from shifting in the extension direction.

2. Related Art

Thus far, a tube support member that includes a tube receiving opening into which a tube is inserted and that supports the tube by the inner circumferential surface of the tube receiving opening making contact with the outer circumferential surface of the tube is known as a tube support member used in an ink jet recording apparatus (for example, see JP-A-2006-231837).

Incidentally, with such a configuration, when a pulling force acts on the tube, friction and the like between the outer circumferential surface of the tube and the inner surface of the tube receiving opening causes antagonism with the resulting tension while causing the dimensions of the tube to deform; in this state, even if the pulling force is released, the dimensional deformation will not be completely ameliorated due to the friction acting on the tube, and the dimensional change will to an extent remain. In other words, with the stated configuration, there is a problem in that the residual tension continues to act even after the pulling force has been released, and thus not only does the cross-sectional surface area of the tube change, but the tube deteriorates more easily, is more susceptible to failures, and so on.

SUMMARY

An advantage of some aspects of the invention is to provide an ink jet recording apparatus capable of effectively preventing a tube from moving in response to a pulling force and capable of restoring a tube to its original state upon the release of the pulling force.

An ink jet recording apparatus according to an aspect of the invention is an ink jet recording apparatus that prints using an ink jet head, and includes: a main recording apparatus body that includes the ink jet head and an apparatus case that houses the ink jet head; an ink tank unit, including an ink tank, that is provided separate from the main recording apparatus body; an ink tube, connected to the ink jet head and the ink tank, that supplies ink from the ink tank to the ink jet head; and a tube support member, having a bent-shape surface that makes contact with the ink tube, that, when the ink tube has been pulled, causes friction to arise between the bent-shape surface and the ink tube, the friction working against the pulling force in order to suppress the ink tube from moving in the extension direction of the ink tube.

In this case, it is preferable for the tube to be configured of silicone rubber.

According to this configuration, when a pulling force acts between the bent-shape surface and the ink tube, a component force acting as contact force occurs at the friction contact surface, which is the surface that makes contact with the ink tube, and a high degree of friction is generated in response to this component force. Through this, the tube is strongly supported in a state in which the tube does not shift with the dimensions of the tube changing. Meanwhile, when the pulling force is released, the component force is also eliminated, and the tube is freed; the dimensions of the tube return to normal, and the tension is eliminated. In this manner, the position of the tube can be effectively prevented from shifting in response to a pulling force, and the tube can be restored to its original state when the pulling force is released. Accordingly, deterioration, failures, and so on in the tube can be prevented.

In addition, the ink tank unit is connected to the apparatus case in a removable state.

In addition, the ink tube includes a bridging tube portion that spans from the tank unit to the main recording apparatus body, and the tube support member causes friction to arise, on the side of the main recording apparatus body, that works against a pulling force acting on the bridging tube portion.

In addition, the ink tube includes a bridging tube portion that spans from the tank unit to the main recording apparatus body, and the tube support member causes friction to arise, on the side of the ink tank unit, that works against a pulling force acting on the bridging tube portion.

An ink jet recording apparatus according to another aspect of the invention includes: a main recording apparatus body that includes an ink jet head; a tank unit, including an ink tank, that is connected to the main recording apparatus body in a removable state; an ink tube, connected to the ink tank and the ink jet head, that includes a bridging tube portion spanning from the tank unit to the main recording apparatus body; a first shift prevention portion, provided in the main recording apparatus body, that includes the stated tube support member supporting a base area of the bridging tube portion on the side of the main recording apparatus body; and a second shift prevention member, provided in the tank unit, that includes the stated tube support member supporting the base area of the bridging tube portion on the side of the tank unit.

According to this configuration, a highly-stable ink jet recording apparatus can be provided by using the tube support member, which is capable of suppressing degradation, failures, and so on in the tube, to support the ink tube that connects the main recording apparatus body to the tank unit that is removable from the main recording apparatus body. In particular, it is possible to effectively prevent the ink tube from pulling out of a flow channel coupling on the side of the main recording apparatus body or a flow channel coupling on the side of the tank unit due to an unforeseen pulling force.

In the stated ink jet recording apparatus, it is preferable for the first shift prevention portion to be provided in a lower portion of the main recording apparatus body, for the second shift prevention member to be provided in a lower portion of the tank unit, and for the bridging tube portion to be provided in an inverse U-shape in the upward direction.

According to this configuration, because the bridging tube portion is provided so as to form an inverted U-shape (that is, a mountain shape) in the upward direction, the bridging tube portion can be given slack between the tank unit and the main recording apparatus body while effectively using that space. Accordingly, tension against the ink tube is canceled out by the slackened area, making it possible to prevent the occurrence of a pulling force. In addition, the movement range of the tank unit when the tank unit is separated can be increased, increasing the convenience of the apparatus.

In this case, it is preferable for the second shift prevention member to further include a receiving member, disposed opposing the tube support member, that regulates the position of the ink tube relative to the tube support member.

According to this configuration, the receiving member that regulates the position of the ink tube along with the tube support member is provided opposing the tube support member (friction contact surface), and thus the ink tube can be regulated in a predetermined position even when the pulling force has been eliminated.

In this case, it is preferable for multiple ink tubes to be disposed in parallel, and for the friction contact surface to extend in the direction that is parallel to the multiple bridging tube portions in the multiple ink tubes and make contact with the multiple bridging tube portions at the same time.

According to this configuration, the multiple bridging tube portions can be supported at the same time by a single tube support member (friction contact surface), and thus the configuration of the ink jet recording apparatus can be simplified.

In this case, it is preferable for multiple second shift prevention members to be provided in the tank unit, adjacent in the extension direction of the bridging tube portion, and for each friction contact surface of the multiple second shift prevention members to make contact with the bridging tube portions from different shear directions.

According to this configuration, multiple second shift prevention members are disposed in the extension direction of the bridging tube portions, making contact therewith from different shear directions, which makes it possible to accommodate a pulling force from a wider angular range.

BRIEF DESCRIPTION OF THE DRAWINGS

The invention will be described with reference to the accompanying drawings, wherein like numbers reference like elements.

FIG. 10A is a perspective view illustrating a tube holding member, whereas

DESCRIPTION OF EXEMPLARY EMBODIMENTS

Hereinafter, an ink jet recording apparatus according to an embodiment of the invention will be described with reference to the appended drawings. This ink jet recording apparatus is an ink jet printer that employs what is known as a CISS (Continuous Ink Supply System); this printer prints image data onto print paper by an ink jet head (carriage) making main scans in the horizontal direction while the print paper makes sub scans in the vertical direction.

Figure 1:
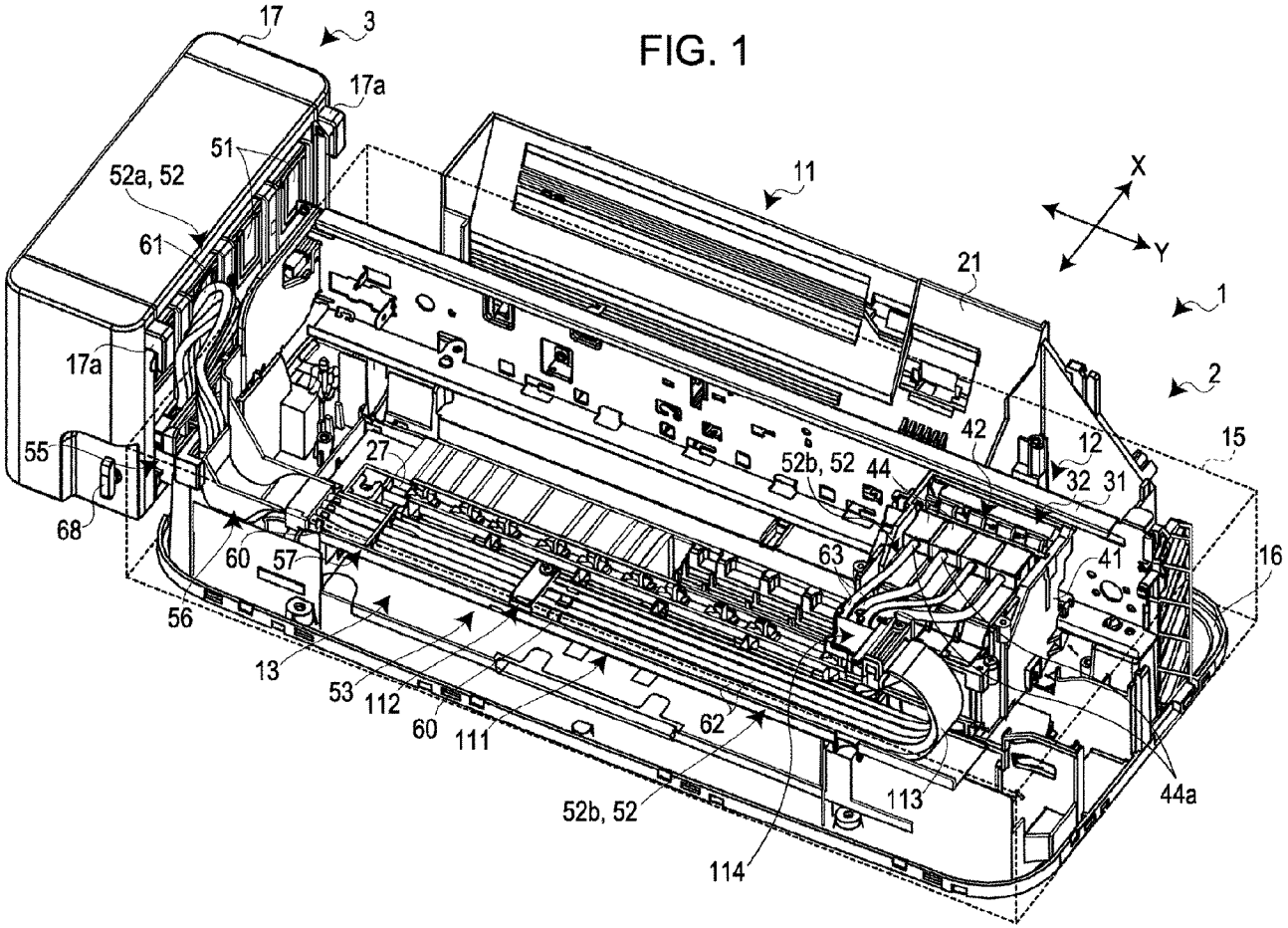
FIG. 1 is a perspective view illustrating an ink jet recording apparatus according to an embodiment.

FIG. 1 is a perspective view illustrating an ink jet recording apparatus 1. Here, descriptions will be provided assuming that the depth direction in FIG. 1 is taken as the X-axis direction and the horizontal direction that is orthogonal to the X-axis direction in FIG. 1 is taken as the Y-axis direction.

As shown in FIG. 1, the ink jet recording apparatus 1 is configured of a main recording apparatus body 2 and a tank unit 3 connected to the main recording apparatus body 2 in a removable state; the various constituent elements of the ink jet recording apparatus 1 are mounted in the main recording apparatus body 2 and the tank unit 3. Specifically, the ink jet recording apparatus 1 includes a transport unit 11 that transports the print paper (as single sheets) in the X-axis direction (a transport direction), a printing unit 12 that faces the upper side of the transported print paper and that performs a printing process on the print paper, off-carriage type ink tanks 51 for each of Y, M, C, and K colors, and an ink supply portion 13 that supplies the Y, M, C, and K color inks to the printing unit 12. The transport unit 11 and the printing unit 12, as well as part of the ink supply portion 13, are mounted in the main recording apparatus body 2, and the part of the ink supply portion 13 that includes the ink tanks 51 for the Y, M, C, and K colors is mounted in the tank unit 3.

The Y, M, C, and K color inks held in the tank unit 3 are sent to an ink jet head 43 in the printing unit 12 via ink tubes 52 (mentioned later), and a printed image is formed on the print paper by making main scans in which the ink jet head 43 ejects ink while the print paper makes sub scans (that is, is transported intermittently).

The outer contour of the main recording apparatus body 2 is formed of a box-shaped apparatus case 15 (in FIG. 1, the upper part of the case is not shown), and a pair (front and rear) of lock receiving portions (not shown) for mounting the tank unit 3 is formed in the left wall of the upper case. Meanwhile, the outer contour of the tank unit 3 is formed of a box-shaped unit case 17, and a pair (front and rear) of locking portions 17a, which interlock with respective lock receiving portions, is formed in the right wall of the unit case 17. In other words, by interlocking the locking portions 17a with the lock receiving portions from above, the tank unit 3 can be mounted in the main recording apparatus body 2 in a removable state. Through this, the tank unit 3 can be connected to the main recording apparatus body 2 in a removable state while the ink tubes 52 are connected to the tank unit 3. Note that the tank unit 3 is normally mounted in the main recording apparatus body 2 in a vertically upright orientation (an ink supply orientation), and when the ink tanks 51 are refilled with ink, the ink tanks 51 are removed from the main recording apparatus body 2 and positioned in a sideways orientation (an ink refill orientation).

Figure 2:
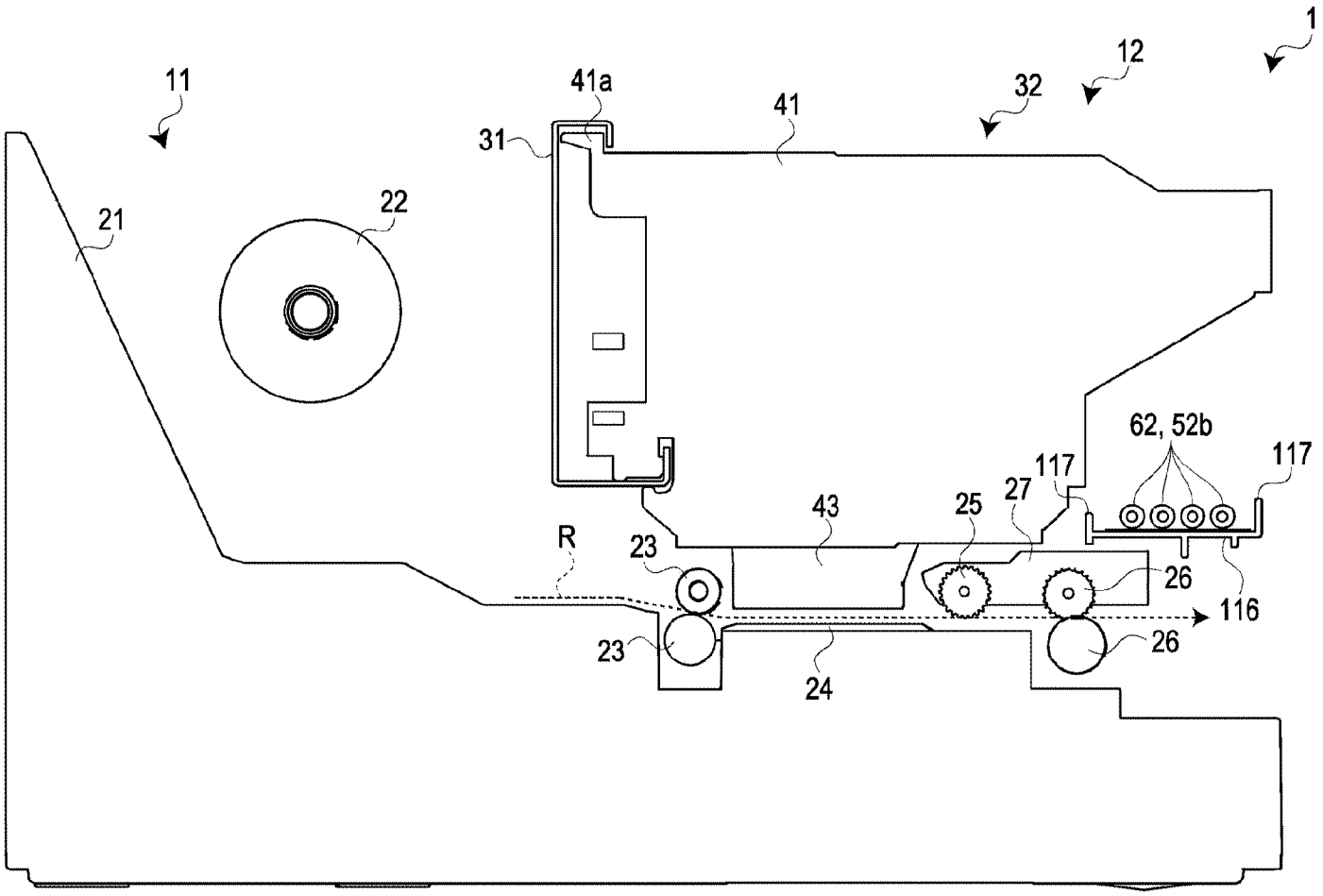
FIG. 2 is a cross-sectional view illustrating the ink jet recording apparatus.

As shown in FIG. 1 and FIG. 2, the transport unit 11 includes: a paper tray 21 in which the print paper is set so as to be aligned to the right; a separation roller 22 that feeds out the print paper from the paper tray 21 one sheet at a time; paper feed rollers 23 and 23 (nip rollers), located downstream from the separation roller 22, that feed the print paper to the printing unit 12 along a transport path R; a platen 24, located downstream from the paper feed rollers 23 and 23, and opposes the printing unit 12 (head unit 42); a guide roller 25, located downstream from the platen 24, that guides the print paper from above; paper discharge rollers 26 and 26 (nip rollers), located downstream from the guide roller 25, that discharge the print paper from a paper discharge port (not shown); and a paper discharge frame 27 that supports the guide roller 25 and the upper paper discharge roller 26.

In this case, the paper feed rollers 23 and 23 function as main rollers that control the transport of the print paper (that is, the sub scans), whereas the paper discharge rollers 26 and 26 function as tension rollers (slip rollers) that apply tension to the print paper that faces the upper side of the platen 24. The guide roller 25, meanwhile, pushes on the leading edge of the transported print paper in order to prevent jamming. The print paper that is introduced from the paper tray 21 by the separation roller 22 is transported in the X-axis direction along the transport path R by the paper feed rollers 23 and 23, the guide roller 25, and the paper discharge rollers 26 and 26, and is discharged from the paper discharge port after the printing is complete. In this case, the feeding of the print paper during printing is intermittent transport, or in other words, line-by-line feeding carried out as sub scans.

The printing unit 12 includes: a guide frame 31 that is supported by an apparatus frame 16 and extends across the entire width of the Y-axis direction; a carriage unit 32 that is supported so as to be capable of back-and-forth movement along the guide frame 31; and a carriage movement mechanism (not shown) that moves the carriage unit 32 along the guide frame 31. The ink jet head 43 is mounted in the carriage unit 32.

The guide frame 31 is formed in a "C" shape when viewed along the cross-section thereof, and an interlocking slider portion 41a of the carriage unit 32 (carriage 41) is fitted into the guide frame 31 and supported on one side so as to be capable of moving back and forth in the extension direction (the Y-axis direction), or in other words, so as to be capable of sliding. The carriage movement mechanism includes: a timing belt that extends along the guide frame 31; a driving pulley and a slave pulley upon which the timing belt is stretched; a connection anchoring portion that connects the timing belt to the carriage unit 32 (the carriage 41); and a carriage motor that drives the driving pulley (none of these are shown). When the carriage motor rotates forward or backward, the carriage unit 32 moves back and forth in the Y-axis direction (the horizontal direction) via the timing belt. The main scans are carried out by driving the ink jet head 43 in the carriage unit 32 to perform ejecting operations during the back-and-forth movement.

The carriage unit 32 includes: the box-shaped carriage 41, which is supported through the interlocking slider portion 41a so as to be capable of moving back and forth by the guide frame 31; and the head unit 42, which is integrated in the carriage 41. The head unit 42 includes: the ink jet head 43, which has four-nozzle rows that respectively eject ink droplets of the Y, M, C, and K colors; and connection adapters 44, for each of the Y, M, C, and K colors, that are connected directly to the ink jet head 43 and are connected to the downstream ends of the ink tubes 52. The ink jet head 43 has four-nozzle rows (not shown), for the Y, M, C, and K colors, that are parallel to each other and extend in the X-axis direction; the nozzle rows are provided facing downward toward the transported print paper with a predetermined paper gap therebetween. Each of the connection adapters 44 includes an ink buffer, an ink filter, and so on, and inflow couplings 44a for connecting to respective ink tubes 52 are provided in the upper portions of the connection adapters 44. Note that the connection adapters 44 have approximately the same external shape as the ink cartridges, and the carriage unit 32 (main recording apparatus body 2) is configured so that both on-carriage and off-carriage ink holding units can be employed.

In the printing process, the image data is printed onto the print paper by intermittently transporting the print paper (sub scanning operations, or line-by-line feeding) using the transport unit 11 and causing the printing region of the print paper to face the ink jet head 43 from therebelow, and moving the carriage unit 32 forward and/or backward (main scanning operations) using the carriage movement mechanism while driving the ink jet head 43. Note that in the paper supply operations occurring up until the start of printing and the paper discharge operations occurring after the end of printing, the print paper is fed continuously.

Figure 3:
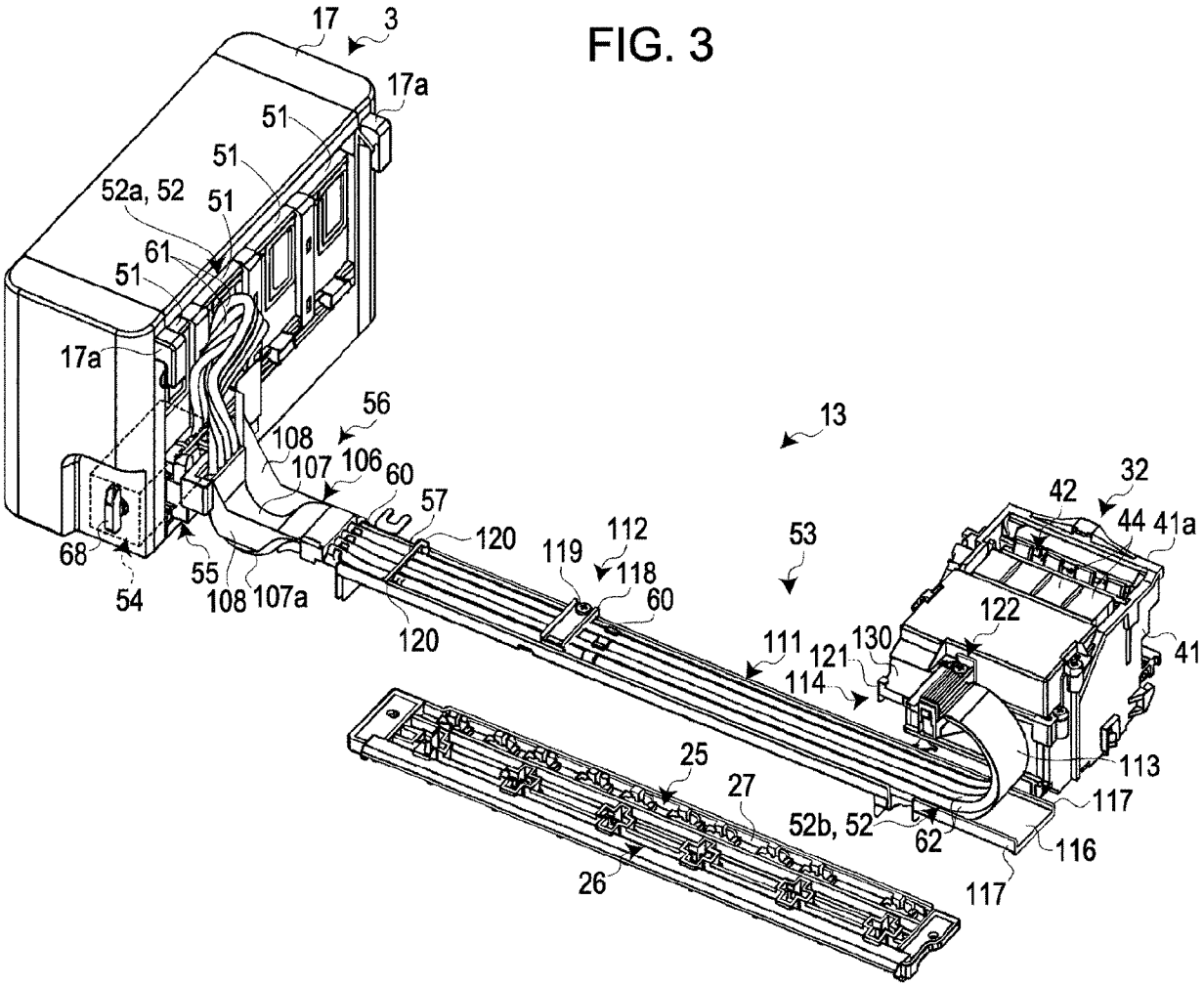
FIG. 3 is a perspective view illustrating the vicinity of an ink supply portion.

As shown in FIG. 1 and FIG. 3, the ink supply portion 13 includes: the ink tanks 51 for each of the Y, M, C, and K colors; the four ink tubes (tubes) 52 that connect respective ink tanks 51 to the head unit 42 (that is, to the inflow couplings 44a of the respective connection adapters 44) based on the Y, M, C, and K colors; and a guide mechanism 53 that guides the paths of the four ink tubes 52. Furthermore, the ink supply portion 13 includes: a manual valve unit 54, installed in a lower portion of the tank unit 3, that opens/closes the flow channels on the upstream end of the four ink tubes 52; a tank-side pullout prevention member 55, also provided in a lower portion of the tank unit 3, that prevents couplings on the side of the ink tanks 51 (outflow couplings 51b, mentioned later) from pulling out; a main body-side pullout prevention member (shift prevention member, first shift prevention portion) 56, installed in a lower portion within the main recording apparatus body 2, that prevents a coupling on the side of the main recording apparatus body 2 (an intermediate coupling 57, mentioned later) from pulling out; and the intermediate coupling 57, provided in the four ink tubes, serving as a connection coupling on the side of the main recording apparatus body 2.

Figure 4:
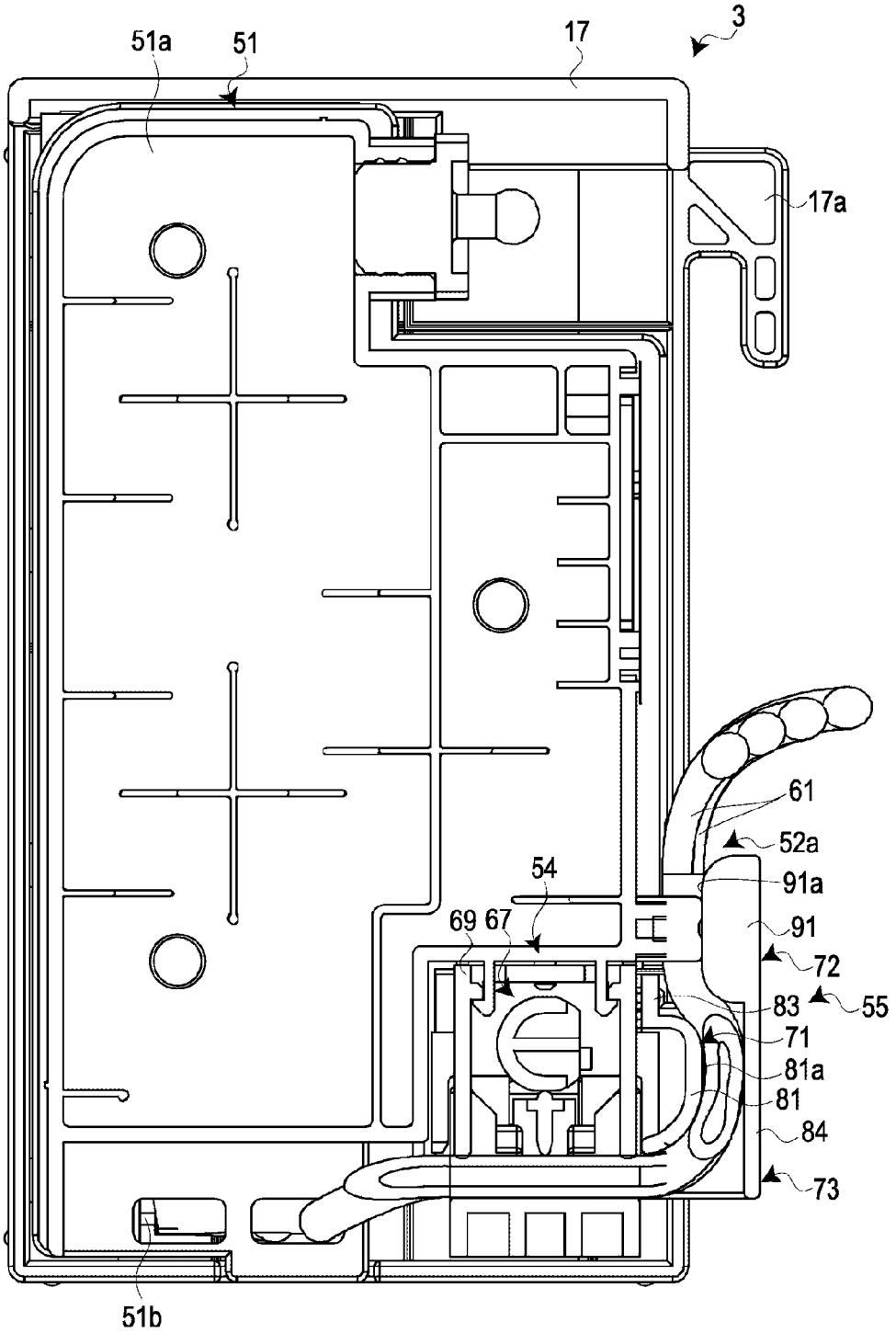
FIG. 4 is a cross-sectional view illustrating a tank unit.
Figure 5:
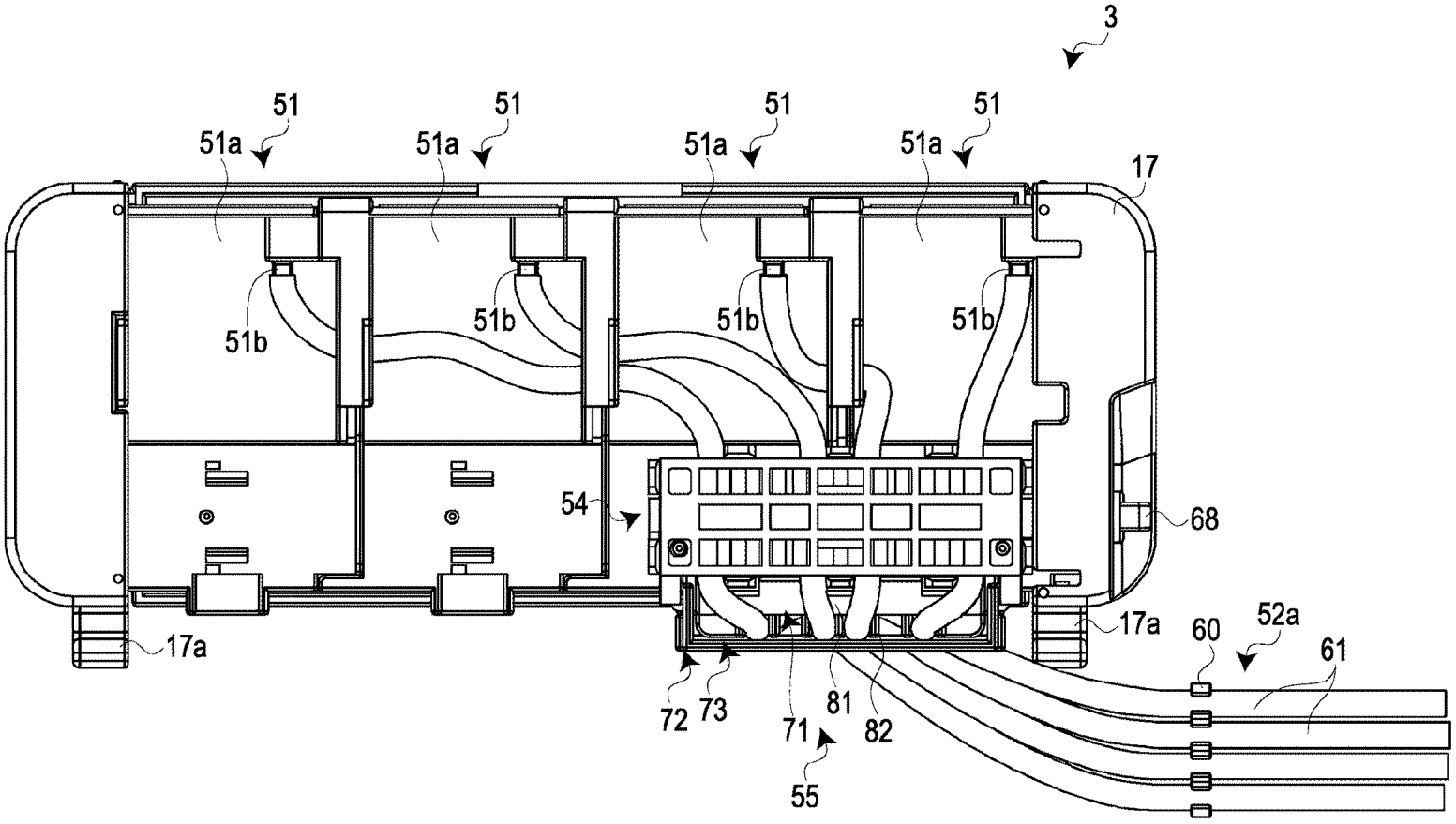
FIG. 5 is a bottom view illustrating the tank unit.

FIG. 4 is a cross-sectional view illustrating the tank unit 3, and FIG. 5 is a bottom view illustrating the tank unit 3. As shown in FIG. 4 and FIG. 5, each of the ink tanks 51 holds a corresponding color of ink, and the ink tanks 51 are disposed parallel to the X-axis direction. Each of the ink tanks 51 includes a main tank body 51a and the outflow coupling 51b, formed in a lower portion of the main tank body 51a and protruding in the Y-axis direction. The upstream ends of the ink tubes 52 are inserted and fitted into respective outflow couplings 51b.

As shown in FIG. 1 and FIG. 3, the four ink tubes 52 are configured of silicone rubber, and are disposed parallel to the horizontal direction. In addition, the four ink tubes 52 are guided by the guide mechanism 53 so as to run from the ink tanks 51 to the head unit 42. Furthermore, linking members 60 that link the four ink tubes 52 in parallel are provided in multiple locations in the extension direction of the four ink tubes 52, and the ink tubes 52 are thus arranged in parallel in a row.

The ink tubes 52, whose upstream ends are connected to respective ink tanks 51 via the outflow couplings 51b, are significantly bent in the upward direction from the tank unit 3 and cross over to the main recording apparatus body 2, and are disposed so as to traverse the main recording apparatus body 2 from the intermediate coupling 57; at the right side of the main recording apparatus body 2, the ink tubes 52 make a U-turn in the upward direction, turn further in toward the back end of the apparatus, and the downstream ends of the ink tubes 52 are then connected to the respective connection adapters 44 through the inflow couplings 44a.

Tank-side tubes 52a of the ink tubes 52, which span from the outflow couplings 51b to the intermediate coupling 57, include bridging tube portions 61 that span between the tank unit 3 and the main recording apparatus body 2 with the base ends of the tank-side tubes 52a being supported by the stated tank-side pullout prevention member 55 and the main body-side pullout prevention member 56, respectively. On the other hand, head-side tubes 52b of the ink tubes 52, which span from the intermediate coupling 57 to the inflow couplings 44a, include: U-shaped tube portions 62 that form a horizontal U-shape and are disposed so as to traverse the interior of the main recording apparatus body 2; and bent tube portions 63, linked to the downstream sides of the U-shaped tube portions 62, that are bent toward the carriage unit 32 in an L shape within the horizontal plane.

The bridging tube portions 61 have their upstream sides supported by the tank-side pullout prevention member 55 and their downstream sides supported by the main body-side pull-out prevention member 56, and are provided in an inverse U shape (a mountain shape) spanning from the tank unit 3 to the main recording apparatus body 2. The stated valve unit 54 faces the tank-side tubes 52a, which are located on the upstream side of the bridging tube portions 61. The tank-side tubes 52a located on the downstream side of the bridging tube portions 61 are connected to the intermediate coupling 57 on the downstream side of the immediate vicinity of the main body-side pullout prevention member 56.

Meanwhile, the U-shaped tube portions 62 are disposed in a horizontal U-shape in an area located before the region in which the carriage unit 32 moves back and forth, or in other words, in an area directly above the stated paper discharge frame 27. In this case, the sides of the U-shaped tube portions 62 that are on the intermediate coupling 57 side (that is, the ink tanks 51 side) are fixed sides, and the sides that are on the carriage 41 side are mobile sides, and the U-shaped tube portions 62 deform so as to follow the back-and-forth movement of the carriage 41 while maintaining the horizontal U-shape running from the bottom to the top. In other words, the U-shaped tube portions 62 are provided parallel to the path of the back-and-forth movement of the carriage unit 32, and deform so as to maintain the horizontal U-shape central to the mobile sides that move along with the back-and-forth movement of the carriage unit 32.

The bent tube portions 63 extend from the U-shaped tube portions 62, and the downstream ends thereof are connected to the respective connection adapters 44 through the inflow couplings 44a after being bent in the vertical direction within the horizontal plane. A tube holding member 122 (described in detail later) that anchors the head-side tubes 52b to the carriage 41 is provided in the border area between the U-shaped tube portions 62 and the bent tube portions 63.

Note that the circumferential surfaces of the ink tubes 52 (the tank-side tubes 52a and the head-side tubes 52b) are provided with line-shaped marks (not shown), in a single location in the circumferential direction, that extend continuously in the extension direction. These marks are used to visually identify the presence/absence of twists in the ink tubes 52 when the tube portions 61, 62, and 63 are installed; for example, the bridging tube portions 61 are disposed so that the marks are on the inside of the inverse U-shape, and the U-shaped tube portions 62 and bent tube portions 63 are disposed so that the marks are on the inside of the U-shape. Through this, distortion in the ink tubes 52 can be suppressed when running the ink tubes 52.

Figure 6:
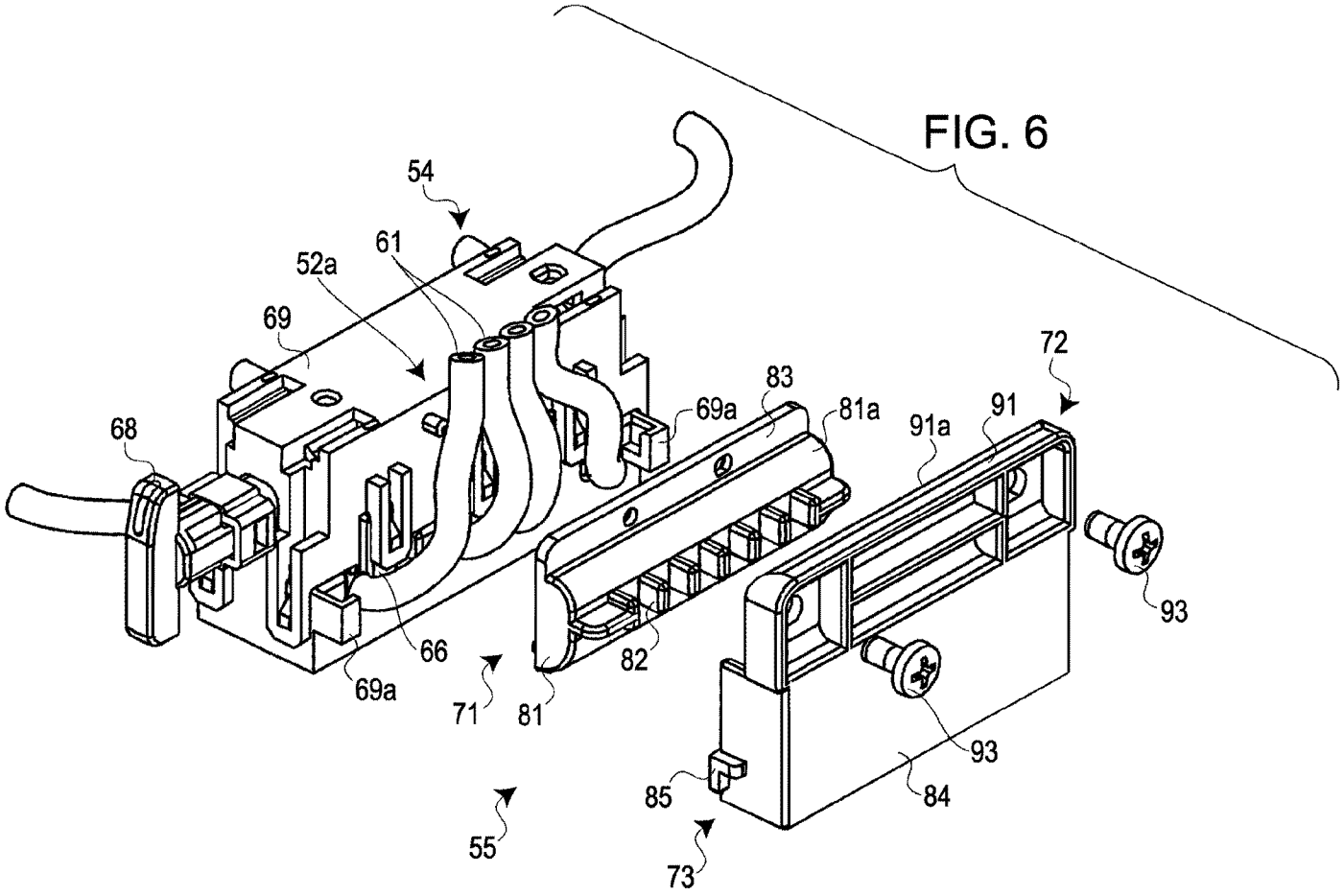
FIG. 6 is an exploded perspective view illustrating the periphery of a valve unit.

FIG. 6 is an exploded perspective view illustrating the periphery of the valve unit 54. As shown in FIGS. 4, 5, and 6, the valve unit 54 is installed in the base of the tank unit 3, and faces the upstream end areas of the four ink tubes 52 (bridging tube portions 61) from above. The valve unit 54 includes: a position regulation portion 66 that regulates the positions of the four ink tubes 52 so as to be aligned side by side; a main valve body 67 that faces the four position-regulated ink tubes 52 and pinches the flow channels in the four ink tubes 52 at the same time to close the all flow paths; an operation lever 68 having a cam for flow channel opening/closing operations performed by the main valve body 67 (that is, for advancing/retracting the main valve body 67); and an approximately rectangular-shaped valve frame 69 that supports the stated elements. When there is a risk of problems such as leaks or the like in the ink supply portion 13, such as when ink is being refilled or the apparatus is being transported, the valve unit 54 forcefully closes the flow channels as the result of user operation.

The tank-side pullout prevention member 55 is attached to a side wall of the valve frame 69, and at the base portions of the bridging tube portions 61 on the side of the tank unit 3, the four ink tubes 52 are supported having been bent into an S-shape while being run upward along the side wall of the valve frame 69. Specifically, the tank-side pullout prevention member 55 includes: a lower tube support member (tube support member) 71 that supports the upstream-side bent portions of the S-shapes in the ink tubes 52 (that is, the convexly-bent portions when viewed from the valve frame 69) in a bent state; an upper tube support member (tube support member) 72 that covers the four ink tubes 52 and supports the downstream-side bent portions of the S-shapes in the ink tubes 52 (that is, the concavely-bent portions when viewed from the valve frame 69) in a bent state, from the opposite side to the lower tube support member 71; and a receiving member 73, formed integrally with the upper tube support member 72, that opposes the lower tube support member 71. In other words, the support location of the lower tube support member 71 (that is, the point of contact with the ink tubes 52) and the support location of the upper tube support member 72 (that is, the point of contact with the ink tubes 52) are provided so that their locations are skewed in the extension direction of the ink tubes 52 (that is, the vertical direction). Note that part of the stated unit case 17 also functions as a receiving member that opposes the upper tube support member 72.

The lower tube support member 71 leads the path of the ink tubes 52 that protrude horizontally from the valve unit 54 in the upward direction, and supports the ink tubes 52 so as not to shift in the extension direction when a pulling force from the extension direction acts upon the ink tubes 52. Specifically, the lower tube support member 71 is formed of the following elements, in an integrated manner: a friction contact portion 81, having a friction contact surface 81a that makes contact with the four ink tubes 52 that are in a bent state and generates friction against the pulling force acting between the four ink tubes and the friction contact surface;

multiple partition plates 82, protruding from the friction contact surface 81a, that serve as spacers between the friction contact surface 81a and the receiving member 73 and that align the four ink tubes 52; and an anchor portion 83 for anchoring the friction contact portion 81 to a side wall of the valve frame 69.

Meanwhile, the receiving member 73 includes: a position regulation plate portion 84 that opposes the lower tube support member 71 and regulates the positions of the four ink tubes 52 between the position regulation plate portion 84 and the lower tube support member 71; and a pair (front and back) of interlocking portions 85 that interlock with lock receiving portions 69a formed in the side walls of the valve frame 69. Note that the partition plates 82 of the lower tube support member 71 regulate the widths of the four ink tubes 52, and make contact with the receiving member 73. Accordingly, the four ink tubes 52 are not collapsed by the attached receiving member 73.

Like the lower tube support member 71, the upper tube support member 72 supports the ink tubes 52 so as not to shift in the extension direction when a pulling force from the extension direction acts upon the ink tubes 52. Specifically, the upper tube support member 72 includes: a friction contact portion 91, having a friction contact surface 91a that makes contact with the four ink tubes 52 that are in a bent state and generates friction against the pulling force acting between the four ink tubes and the friction contact surface; a pair (front and back) of contact pins (not shown), protruding from the friction contact surface 91a, that make contact with a side wall of the unit case 17 without touching the ink tubes 52; and a pair (front and back) of support member anchoring screws 93 and 93 for anchoring the friction contact portion 91 to the unit case 17. In other words, the side wall of the unit case 17 regulates the position of the four ink tubes 52 between the unit case 17 and the upper tube support member 72. Furthermore, the four ink tubes 52 are not collapsed by the pair of contact pins in the upper tube support member 72. Note that one "receiving member" mentioned in the aspects of the invention is configured by a side wall of the unit case 17.

The lower tube support member 71 and the upper tube support member 72 (and the receiving member 73) configured in this manner are anchored to the tank unit 3 along with the ink tubes 52 by the lower tube support member 71 being positioned using multiple positioning projections protruding from a side wall of the valve frame 69, the interlocking portions 85 of the upper tube support member 72 being fitted into the lock receiving portions 69a of the valve frame 69, and the upper tube support member 72 furthermore being screwed down onto the unit case 17 at a top area by the support member anchoring screws 93.

Figure 7A:
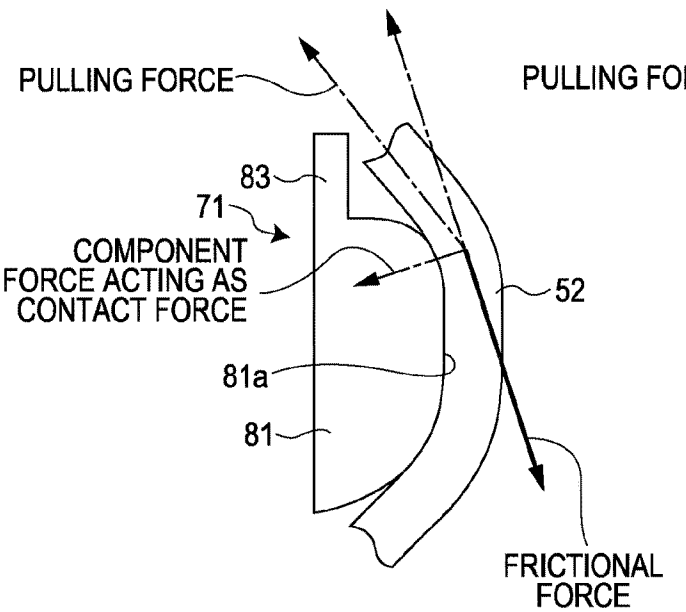
FIGS. 7A through 7C are descriptive diagrams illustrating the effects of a pulling force acting on an ink tube that is in contact with a friction contact surface.
Figure 7B:
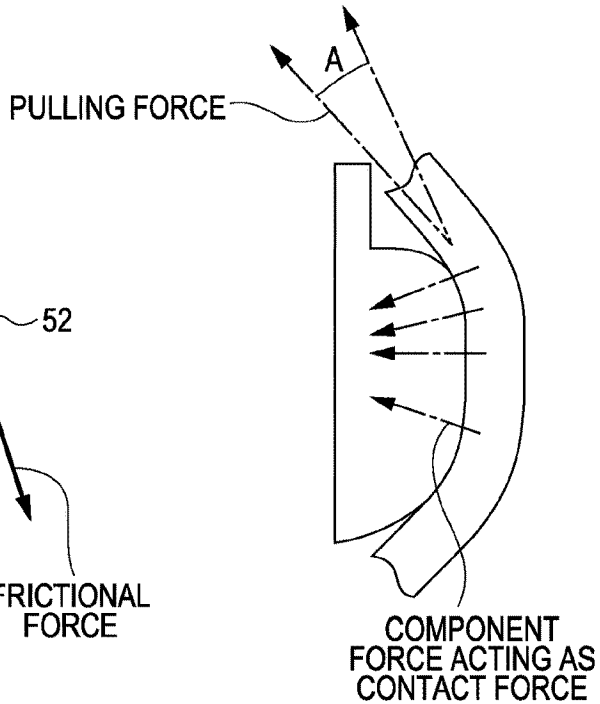
Figure 7C:
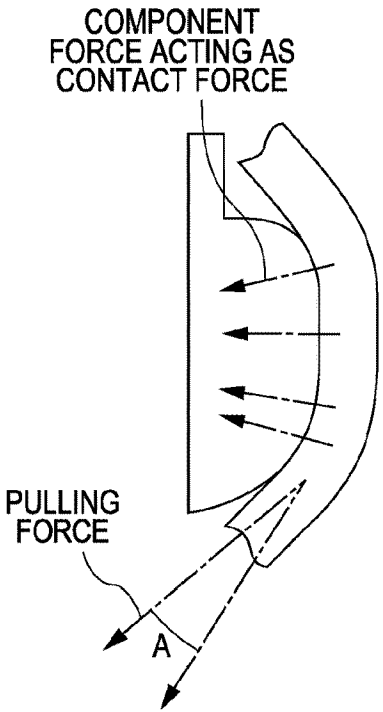

The friction contact surfaces 81a and 91a of the lower tube support member 71 and the upper tube support member 72, respectively, extend parallel to the four ink tubes 52, and make contact with all four ink tubes 52 at the same time. Furthermore, the friction contact surfaces 81a and 91a have bent shapes that result in component force acting as contact force when a pulling force acts in the extension direction of the ink tubes 52. For example, as shown in FIG. 7A, when the ink tubes 52 make contact with the friction contact surfaces 81a and 91a in a bent state and a pulling force arises from the downstream side, a component force acting as contact force arises on the side of the friction contact surface 81a as a result of the pulling force. This contact force causes a strong degree of friction, which strongly regulates the position of the ink tubes in the extension direction. Because the ink tubes 52 are regulated within a predetermined angular range A on the upstream and downstream directions from the respective support locations, the ink tubes 52 are formed in a bent shape that causes the stated friction to arise against a given pulling force from the angular range A (see FIGS. 7B and 7C). Specifically, from the support location of the lower tube support member 71, the positions of the ink tubes 52 on the upstream side are regulated by the position regulation portion 66 of the valve unit 54, whereas the positions on the downstream side are regulated by the upper tube support member 72 and the side wall of the unit case 17. From the support location of the upper tube support member 72, the positions of the ink tubes 52 on the upstream side are regulated by the lower tube support member 71 and the receiving member 73, whereas the ink tubes 52 on the downstream side are run in an inverse U-shape on the side of the main recording apparatus body 2 and thus the positions thereof are regulated toward the top of the main recording apparatus body. The friction contact surfaces 81a and 91a are formed so as to correspond to the angular range A in the extension direction formed by these positional regulations.

In this manner, shift in the extension direction is prevented (that is, positional regulation is carried out) by the two pairs of elements, or the lower tube support member 71 and the receiving member 73, and the upper tube support member 72 and the side wall of the unit case 17; as a result, these elements function so as to prevent the outflow couplings 51b of the tank-side tubes 52a from pulling out. Note that one "shift prevention member" and a "second shift prevention member" mentioned in the aspects of the invention are configured by the lower tube support member 71 and the receiving member 73, whereas one "shift prevention member" and a "second shift prevention member" are configured by the upper tube support member 72 and the side wall of the unit case 17.

As shown in FIG. 1 and FIG. 3, the main body-side pullout prevention member 56 includes a tube support member 106 disposed between a side wall on the side of the tank unit 3 of the apparatus frame 16 and a tube guide 111, mentioned later. The tube support member 106 supports the base portion of the bridging tube portions 61 on the side of the main recording apparatus body 2 so as not to shift in the extension direction when a pulling force has acted on the bridging tube portions 61 from the extension direction. Specifically, the tube support member 106 includes a plate-shaped friction contact portion 107, having a friction contact surface 107a that makes contact with the four ink tubes 52 that are in a bent state from below and generates friction against the pulling force acting between the four ink tubes 52 and the friction contact surface 107a; and a pair (left and right) of plate-shaped width regulation plate portions 108 and 108 that face the four ink tubes 52 from the left and right sides, respectively, regulate the widths of the four ink tubes 52, and also function as side plates of the friction contact portion 107. The friction contact portion 107 and the pair of width regulation plate portions 108 and 108 are formed as a single integrated element.

The friction contact surface 107a of the tube support member 106 extends parallel to the four ink tubes 52, and makes contact with all four ink tubes 52 at the same time. Meanwhile, like the lower tube support member 71 and the upper tube support member 72, the friction contact surface 107a is formed in a bent shape that generates a component force acting as contact force in response to a given pulling force, from the predetermined angular range A, that acts in the extension direction of the ink tubes 52. Specifically, because the ink tubes 52 are run in an inverse U-shape from the support location of the tube support member 106 toward the tank unit 3, the upstream sides thereof have their positions regulated on the upper side of the tank unit 3, whereas the downstream sides thereof have their positions regulated to the intermediate coupling 57 (respective inflow-side ports 101). The friction contact surface 107a is formed so as to correspond to the angular range A in the extension direction formed by these positional regulations. To rephrase, between the side wall of the apparatus frame 16 on the tank unit 3 side and the intermediate coupling 57, the ink tubes 52 are arranged in a bent state using the friction contact portion 107 of the tube support member 106, rather than being arranged in a straight line in which the lengths of the ink tubes 52 are minimum. Accordingly, when the ink tubes 52 are pulled from the outside through the side wall on the tank unit 3 side, the friction contact surface 107a of the friction contact portion 107 generates a contact force against the pulling force acting on the ink tubes 52; as a result, the pulling force is not transmitted to the intermediate coupling 57, which makes it possible to prevent the ink tubes 52 from disconnecting from the intermediate coupling 57. In particular, with the ink jet recording apparatus 1 provided with the main recording apparatus body 2 and the tank unit 3 as in this embodiment, the ink tubes 52 extending from the main recording apparatus body 2 are often pulled from the intermediate coupling 57 unintentionally when replacing the ink, when touched by a user, and so on. However, according to the configuration disclosed by the invention, it is possible to prevent the ink tubes 52 from pulling out from the intermediate coupling 57.

Figure 8:
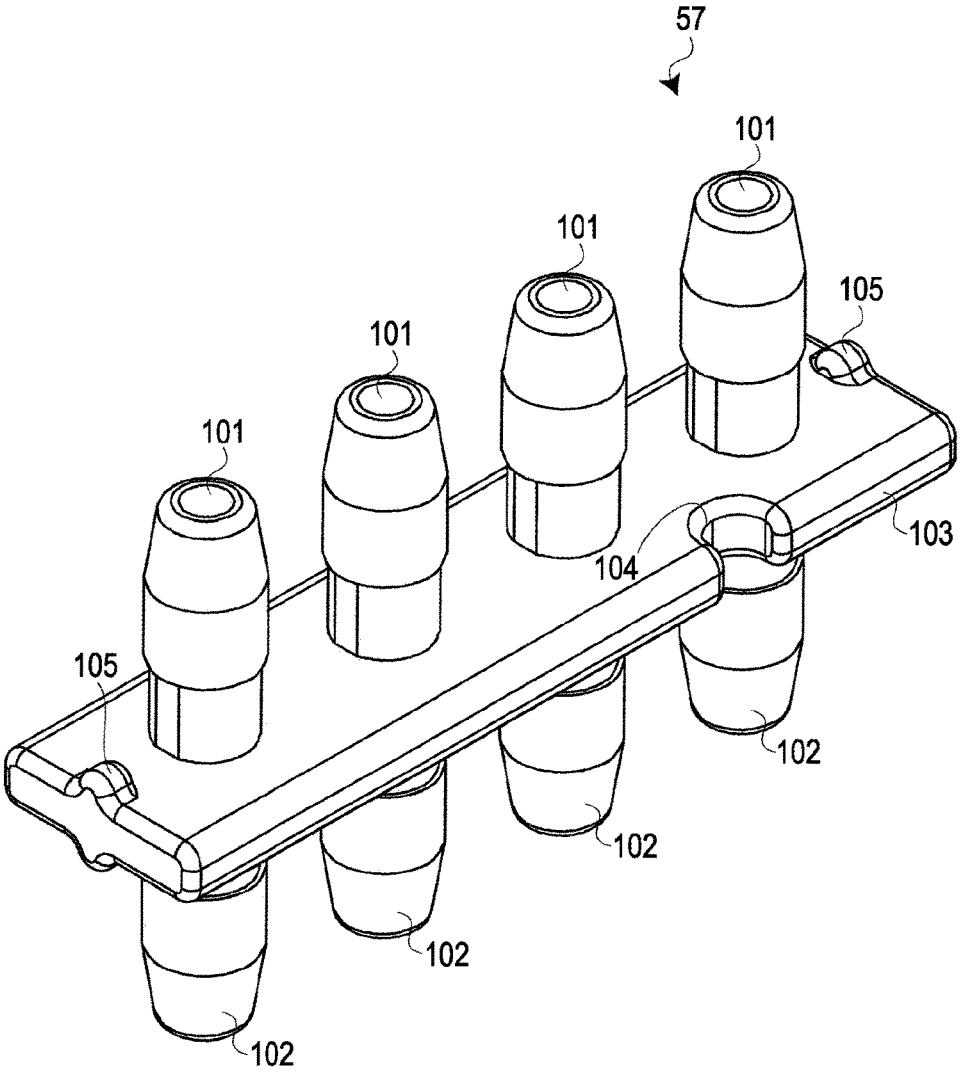
FIG. 8 is a perspective view illustrating an intermediate coupling.

As shown in FIG. 8, the intermediate coupling 57 is provided between the bridging tube portions 61 and the U-shaped tube portions 62 on the fixed side of the U-shaped tube portions 62. The intermediate coupling 57 includes: the four inflow-side ports 101 corresponding to the four ink tubes; four outflow-side ports 102 corresponding to the inflow-side ports 101; a plate-shaped linking portion 103 that links the four inflow-side ports 101 and the four outflow-side ports 102; an interlocking groove 104 that interlocks with a projection in the tube guide 111, which will be mentioned later; and locking projections 105 provided on both sides of the linking portion 103.

The intermediate coupling 57 is snapped into the tube guide 111 at the locking projections 105, and thus does not fall out from the tube guide 111. Furthermore, the interlocking groove 104 prevents the intermediate coupling 57 from being mounted upside-down in the tube guide 111. The downstream ends of the tank-side tubes 52a (bridging tube portions 61) are inserted and fitted into respective inflow-side ports 101, whereas the upstream sides of the head-side tubes 52b (U-shaped tube portions 62) are inserted and fitted into respective outflow-side ports 102. The tank-side tubes 52a and the head-side tubes 52b can be replaced independently using the intermediate coupling 57 configured in this manner.

As shown in FIG. 1 and FIG. 3, the guide mechanism 53 includes: the tube guide 111 that extends parallel to the back-and-forth movement path of the carriage 41 (that is, in the Y-axis direction) and receives the U-shaped tube portions 62 from below; an anchoring member 112 that anchors the U-shaped tube portions 62 to the tube guide 111 on the fixed side; a flexible protective plate 113 affixed to the U-shaped tube portions 62; and a guide unit 114 that holds the mobile ends of the U-shaped tube portions 62 upon the carriage unit 32 and guides the bent shape of the bent tube portions 63.

The tube guide 111 is formed of a single metal plate, and is structured so as to extend in the Y-axis direction (that is, the back-and-forth movement direction of the carriage unit 32) and receive the four ink tubes 52 from below. Specifically, the tube guide 111 includes a base plate portion 116 that extends in the Y-axis direction and receives the four ink tubes 52, and a pair (left and right) of rib plate portions 117 and 117 that project upward from both sides of the base plate portion 116. Meanwhile, the tube guide 111 (base plate portion 116) is disposed above the transport unit 11 (the upper paper discharge roller 26, the paper discharge frame 27, and so on) with a predetermined gap provided therebetween.

Furthermore, the intermediate coupling 57 is attached to the tube guide 111 on the end thereof that is on the side of the tank unit 3. Accordingly, in this area (that is, the rib plate portions 117) of the tube guide 111, a pair of C-shaped guides 120 and 120 for snapping in the intermediate coupling 57 from above are provided. In addition, a projection that interlocks with the interlocking groove 104 of the intermediate coupling 57 is provided in the base plate portion 116 of the tube guide 111.

The anchoring member 112 includes a pressure anchoring portion 118 that presses the four ink tubes 52 down into the tube guide 111 so as to anchor the ink tubes 52, and a fastening screw 119 that screws the pressure anchoring portion 118 down onto the tube guide 111. The anchoring member 112 anchors the four ink tubes 52 onto the tube guide 111 on the fixed side of the U-shaped tube portions 62. Specifically, the four ink tubes 52 are anchored at the upstream ends of the non-mobile regions of the U-shaped tube portions 62. Through this, the deformation of the ink tubes 52 can be stabilized, and the U-shaped tube portions 62 can be prevented from pulling out from the intermediate coupling 57 (the outflow-side ports 102).

The protective plate 113 has one end anchored to the tube guide 111 and the other end held upon the carriage 41, and deforms along with the four ink tubes 52 (the U-shaped tube portions 62) along with the back-and-forth movement of the carriage unit 32. Meanwhile, the protective plate 113 is provided so as to extend along the outer side of the U-shaped tube portions 62 along the R area thereof, thus preventing the U-shaped tube portions 62 from making contact with the other constituent elements on the right side, the upper side, and so on in FIG. 1 (for example, the side wall and top wall of the apparatus case 15). In other words, the protective plate 113 functions as a tube support (Cableveyor®). In addition, although not shown, the protective plate 113 is provided with a string that ties the U-shaped tube portions 62 in an appropriate location.

Figure 9A:
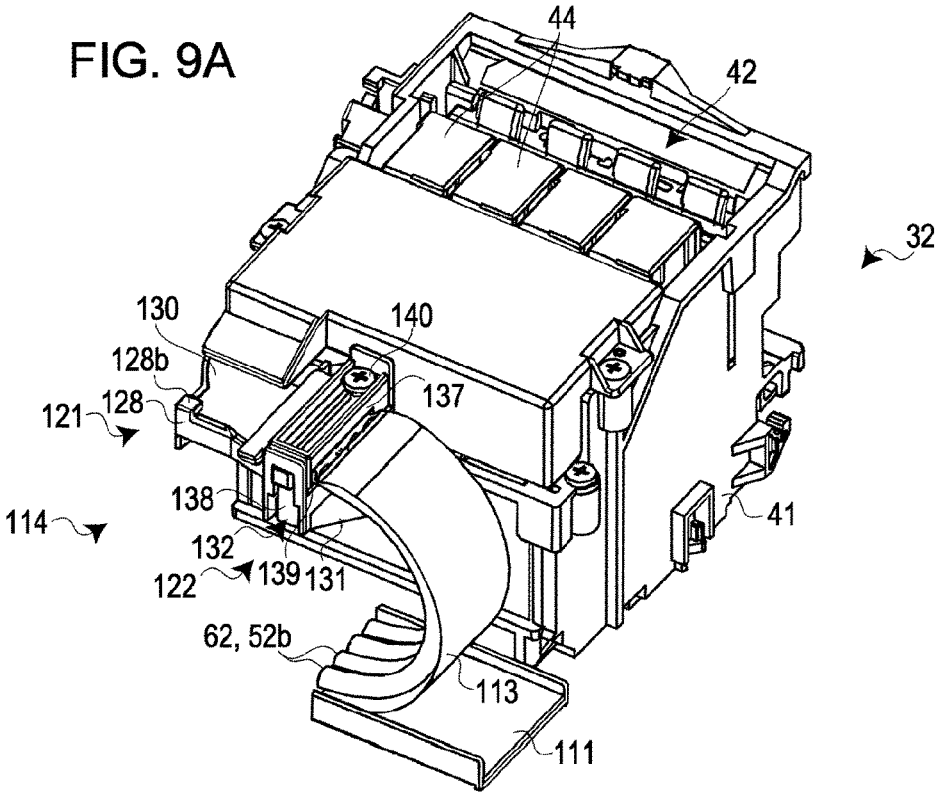
FIGS. 9A and 9B are perspective views illustrating the periphery of a guide unit.
Figure 9B:
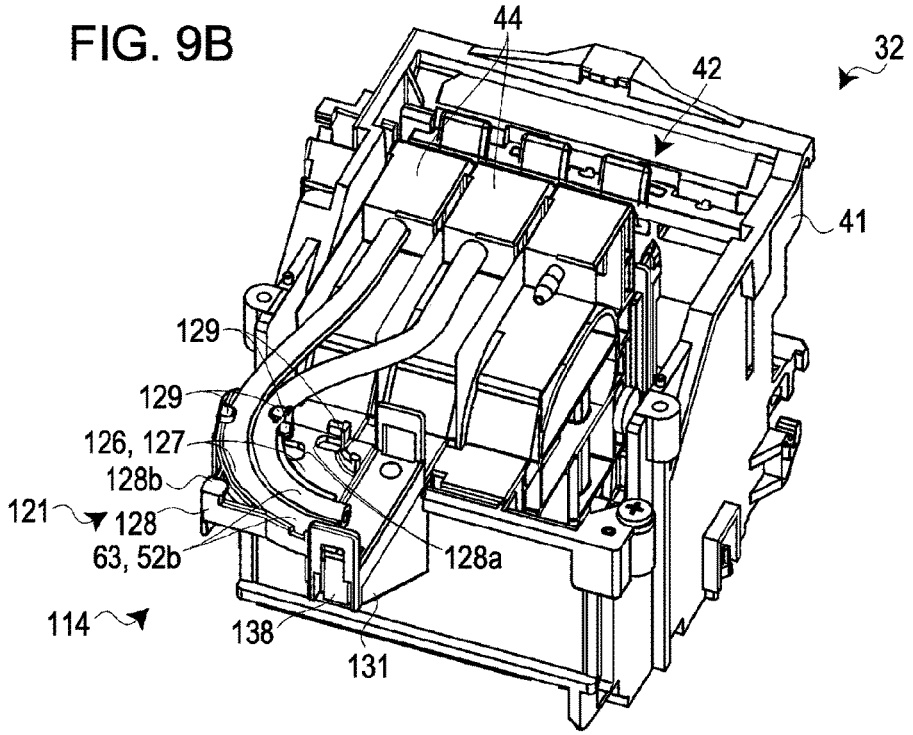
Figure 10A:
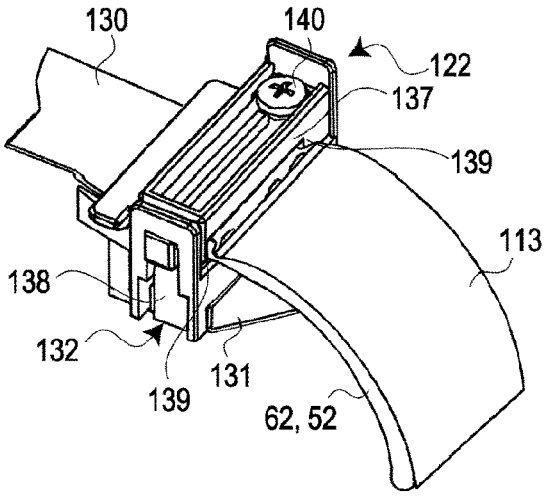
Figure 10B:
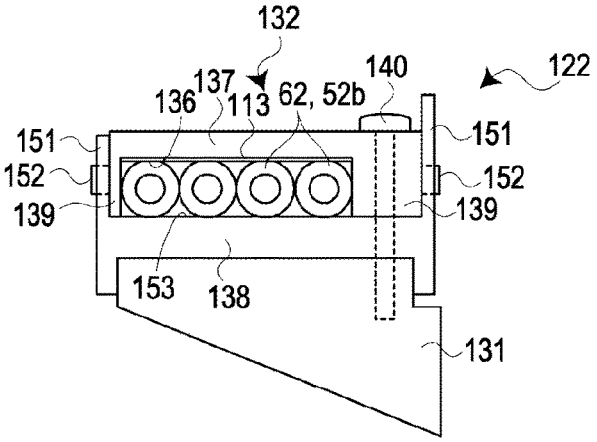
FIGS. 10B and 10C are cross-sectional views illustrating the tube holding member.
Figure 10C:
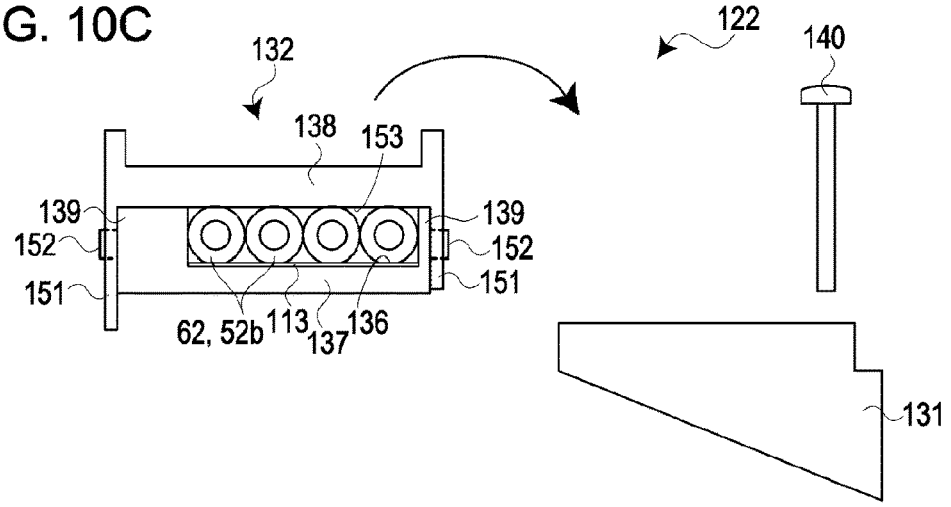

As shown in FIGS. 9A and 9B, the guide unit 114 includes: a guide member 121 that bends the bent tube portions 63 at a right angle within the same horizontal plane and leads the bent tube portions 63 to the head unit 42; and a tube holding member 122, provided in the vicinity of the upstream side of the guide member 121, that holds the mobile ends of the U-shaped tube portions 62 in the stated same horizontal plane. The guide member 121 and the tube holding member 122 are anchored to the carriage 41.

The guide member 121 includes: a main guide body 128, provided in the carriage 41, that has a guide groove 127 configured from two individual guide grooves 126 and 126 that guide two ink tubes 52 each; two pairs of pressure pieces 129 and 129, one each formed in the two individual guide grooves 126 and 126, that press down the ink tubes 52 into the main guide body 128; and a plate-shaped full-region pressure plate 130 that covers the entire open surface of the two individual guide grooves 126 and 126 and presses the ink tubes 52 down into the main guide body 128. Note that the main guide body 128 may be formed so as to be an integrated part of the carriage 41.

The guide groove 127 bends the four ink tubes 52 that are aligned side by side in the same horizontal plane, and includes a single individual guide groove 126 for two adjacent ink tubes 52 (that is, has the two individual guide grooves 126 and 126). Each individual guide groove 126 is formed in a square concave cross-sectional shape and that extends along the guided bent shape, and is formed so as to be slightly narrower than the width of the two side-by-side ink tubes 52. In other words, each individual guide groove 126 supports and guides two ink tubes 52 with the two ink tubes 52 inserted therein side by side.

Each pair of pressure pieces 129 and 129 is formed in the downstream end (the leading end, in the extension direction) of respective individual guide grooves 126, and is formed so as to extend inward from the upper end of the respective side walls of each of the individual guide grooves 126. In other words, the two pressure pieces 129 and 129 that extend inward from the upper end of the respective side walls make contact with the upper surface of the respective ink tubes 52, thus pushing the ink tubes 52 downward. The pair of pressure pieces 129 and 129 are provided so as to be shifted from each other in the extension direction of the individual guide grooves 126. Note that the reference numeral 128a in the drawings refers to a vent hole of the metal mold used when forming the pair of pressure pieces 129 and 129.

The full-region pressure plate 130 covers the entire open surface of the two individual guide grooves 126 and 126, and in particular, is formed in a planar shape that covers the entire upper surface of the main guide body 128. In other words, the full-region pressure plate 130 that covers the entire open surface makes contact with the upper surfaces of the ink tubes 52 and presses the ink tubes 52 downward. The full-region pressure plate 130 is formed integrally with the mobile end of the protective plate 113 (to rephrase, as an extended portion of the protective plate 113), and is affixed to the upper surface of the main guide body 128 by the tube holding member 122 and an affixing piece 128b formed on the main guide body 128. Note that the full-region pressure plate 130 also functions as a protective cover that protects the main guide body 128 and the bent tube portions 63.

As shown in FIGS. 9A to 9B and FIGS. 10A to 10C, the tube holding member 122 includes: a support base 131 anchored to the carriage 41; a tube holder 132, anchored to the support base 131, that holds the four ink tubes 52 side-by-side and holds the mobile end of the protective plate 113; and an anchor screw 140 that anchors the tube holder 132 to the support base 131. In other words, the support base 131 supports the four ink tubes 52 and the protective plate 113 through the tube holder 132.

The tube holder 132 includes: a tube receiving member 137, having a tube receiving surface 136 that receives the four ink tubes 52; and a tube pressing member 138 that is snapped into the tube receiving member 137 and presses the four side-by-side ink tubes 52 against the tube receiving surface 136. Note that when the tube holder 132 is anchored to the support base 131, the tube holder 132 is vertically inverted and anchored. In other words, the support base 131 is anchored with the tube receiving member 137 on the top and the tube pressing member 138 on the bottom.

The tube receiving member 137 includes: the tube receiving surface 136 that receives the four side-by-side ink tubes 52 and the protective plate 113; a pair (left and right) of alignment wall portions 139 and 139, positioned at both side ends of the tube receiving surface 136, that align the four side-by-side ink tubes 52 by regulating the widths thereof; and a pair (left and right) of locking portions 152 and 152, positioned outside of the pair of alignment wall portions 139, that respectively interlock with lock receiving portions 151 and 151 of the tube pressing member 138. Specifically, the four ink tubes 52 are disposed upon the tube receiving surface 136, with the protective plate 113 at the bottom and the ink tubes 52 on the top. Meanwhile, the pair of alignment wall portions 139 and 139 make contact with the side surfaces of the four side-by-side ink tubes 52 (that is, with the right side surface of the ink tube 52 on the right side and the left side surface of the ink tube 52 on the left side), thus regulating the width of the four ink tubes 52.

The tube pressing member 138 includes: a tube pressing surface 153 that presses the four side-by-side ink tubes into the tube receiving surface 136; and the pair (left and right) of lock receiving portions 151 and 151, positioned at both side ends of the tube pressing surface 153, that snap-fit into the pair of locking portions 152 and 152 in the tube receiving member 137.

The anchor screw 140 tightens the tube holder 132 down onto the support base 131, and tightens the tube pressing member 138, mounted on the tube receiving member 137, in an immobile state. In other words, the anchor screw 140 tightens down both the tube pressing member 138 and the tube holder 132, and is screwed into the support base 131.

Figure 11A:
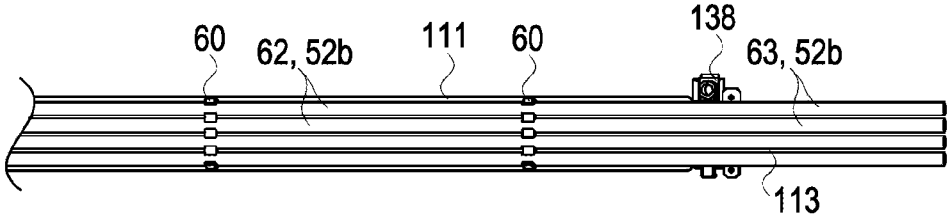
FIGS. 11A through 11C are descriptive diagrams illustrating a process for installing ink tubes in a tube holding member.
Figure 11B:
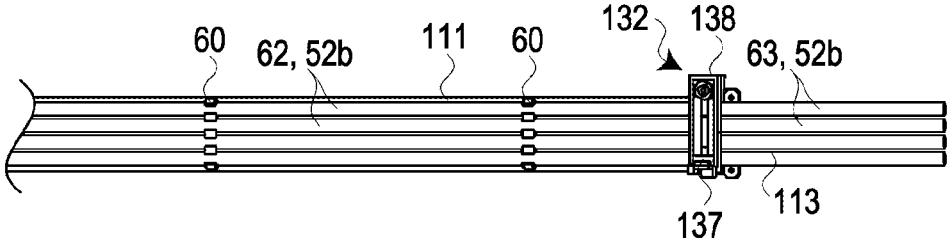
Figure 11C:
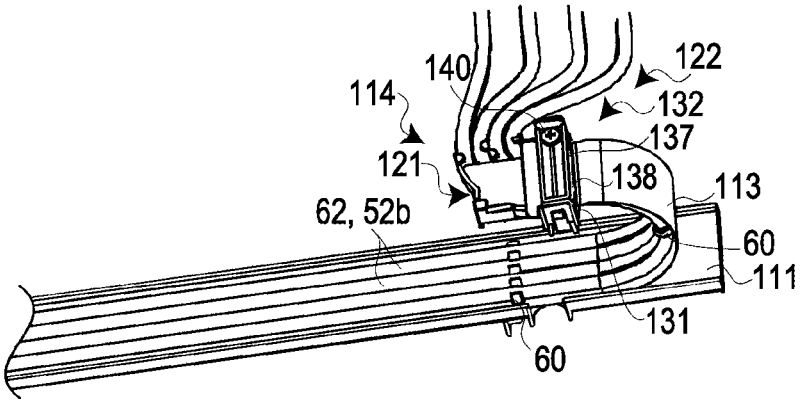

Here, operations for installing the ink tubes 52 in the tube holding member 122 will be described with reference to FIGS. 11A to 11C. As shown in FIGS. 11A to 11C, first, the protective plate 113, which has been run horizontally, is inserted into the tube receiving member 137, and the four ink tubes 52, which run horizontally thereupon, are disposed so as to be aligned side-by-side (FIG. 11A). Once the four ink tubes 52 have been disposed in this manner, the four ink tubes 52 are positioned. Specifically, each of the ink tubes 52 is positioned in the extension direction and in the width direction, and twists in the ink tubes 52 are corrected based on the stated line-shaped marks. After this, the tube pressing member 138 is snapped into the tube receiving member 137 and temporarily anchored (FIG. 11B). When the four ink tubes 52 have been temporarily anchored, the protective plate 113, whose mobile end is held by the tube holder 132, and the four ink tubes 52 are run in a U-shape through the tube holder 132, and the tube holder 132 is then vertically inverted and mounted on the support base 131. After this, the tube holder 132 is fastened onto the support base 131 using the anchor screw 140 (FIG. 11C). Through this, the mobile ends of the ink tubes 52 (the U-shaped tube portions 62) are held in the carriage 41 through the tube holding member 122.

According to the configuration described thus far, when a pulling force is acting in the lower tube support member 71, the upper tube support member 72, and the friction contact portion 107, a component force acting as contact force occurs at the friction contact surfaces 81a, 91a, and 107a, and a high degree of friction is generated in response to this component force. Through this, the ink tubes 52 are strongly supported in a state in which the tubes do not shift with the dimensions of the ink tubes 52 changing. Meanwhile, when the pulling force is released, the component force is also eliminated, and the ink tubes 52 are freed; the dimensions of the ink tubes 52 return to normal, and the tension is eliminated. In this manner, the positions of the ink tubes 52 can be effectively prevented from shifting in response to a pulling force, and the ink tubes 52 can be restored to their original state when the pulling force is released. Accordingly, deterioration, failures, and so on in the ink tubes 52 can be prevented.

Furthermore, because the bridging tube portions 61 are provided so as to form an inverted U-shape (that is, a mountain shape) in the upward direction, the bridging tube portions 61 can be given slack between the tank unit 3 and the main recording apparatus body 2 while effectively using that space. Accordingly, tension against the ink tubes 52 is canceled out by the slackened area, making it possible to prevent the occurrence of a pulling force. In addition, the movement range of the tank unit 3 when the tank unit 3 is separated can be increased, increasing the convenience of the apparatus.

Furthermore, by providing receiving members (the receiving member 73 and the side wall of the unit case 17) that are opposite to the lower tube support member 71 and the upper tube support member 72 (the friction contact surfaces 81a and 91a) and that regulate the positions of the ink tubes 52 along with the tube support members 71 and 72, the ink tubes 52 can be regulated into a predetermined position even when the pulling force is eliminated.

Further still, because the friction contact surfaces 81a, 91a, and 107a extend parallel to the four bridging tube portions 61 and make contact with the four bridging tube portions 61 at the same time, the four bridging tube portions 61 can be supported at the same time by the individual tube support members 71, 72, and 106 (the friction contact surfaces 81a, 91a, and 107a), thus making it possible to simplify the configuration of the ink jet recording apparatus 1.

In addition, by disposing the second shift prevention members (the combination of the lower tube support member 71 and the receiving member 73, and the combination of the upper tube support member 72 and the side wall of the unit case 17) in multiple (that is, two) in the extension direction of the bridging tube portions 61 so as to make contact in different shear directions, the apparatus can handle a pulling force from a wider angular range A.

What is claimed is:

1. An ink jet recording apparatus that prints using an ink jet head, the apparatus comprising:

a main recording apparatus body that includes the ink jet head and an apparatus case that houses the ink jet head;

an ink tank unit, including an ink tank, that includes a case that is separate from the apparatus case, the ink tank being located within the case of the ink tank unit, such that the ink tank unit and the ink tank are provided separate from *and outside of* the main recording apparatus body;

an ink tube, connected to the ink jet head and the ink tank, that supplies ink from the ink tank to the ink jet head; and a tube support member *supported by the ink tank unit, the tube support member* having a bent-shape surface that makes contact with the ink tube, that, when the ink tube is pulled, causes friction to arise between the bent-shape [surfaces] *surface* and the ink tube, the friction working against the pulling force in order to suppress the ink tube from moving in an extension direction of the ink tube, the ink tube being regulated by a first regulation portion located on the ink tank unit and a second regulation portion located on a portion of the tube support member, the first and second regulation portions *both being disposed outside of the main recording apparatus body and* regulating the extension direction of the ink tube within a predetermined angular range, the bent-shape surface that [make] *makes* contact with the ink tube being formed so as to correspond to the predetermined angular range*; and*

*a guide member provided in a carriage that houses the inkjet head, the guide member bends and holds the plurality of ink tubes along a guide portion in a moving direction of the carriage.*

2. The ink jet recording apparatus according to claim 1, wherein the ink tank unit is connected to the apparatus case in a removable state.

3. The ink jet recording apparatus according to claim 1, wherein the ink tube includes a bridging tube portion that spans from the tank unit to the main recording apparatus body; and the tube support member causes friction to arise, on the side of the main recording apparatus body, that works against a pulling force acting on the bridging tube portion.

4. The ink jet recording apparatus according to claim 1, wherein the ink tube includes a bridging tube portion that spans from the tank unit to the main recording apparatus body; and the tube support member causes friction to arise, on the side of the ink tank unit, that works against a pulling force acting on the bridging tube portion.

5. The ink jet recording apparatus according to claim 1, wherein the ink tank unit is connected to the apparatus case in a removable state;

the apparatus case further houses a carriage unit in which the ink jet head is installed and that moves back and forth, and a tube guide that receives the ink tube that extends in the direction of the movement of the carriage unit; and the tube support member is disposed between a side wall of the apparatus case on the side that is connected to the ink tank unit, and the tube guide.

6. The ink jet recording apparatus according to claim 1, wherein the ink can be refilled into the ink tank.

7. The ink jet recording apparatus according to claim 2, wherein the ink can be refilled into the ink tank.

8. The ink jet recording apparatus according to claim 3, wherein the ink can be refilled into the ink tank.

9. The ink jet recording apparatus according to claim 4, wherein the ink can be refilled into the ink tank.

10. The ink jet recording apparatus according to claim 5, wherein the ink can be refilled into the ink tank.

*11. An ink jet recording apparatus that prints using an ink jet head, the apparatus comprising:*

*a main recording apparatus body that includes the ink jet head and an apparatus case that houses the ink jet head;*

*an ink tank unit with a first regulation portion located on the ink tank unit, the ink tank unit including an ink tank and a case that is separate from the apparatus case, wherein the ink tank is located within the case of the ink tank unit such that the ink tank unit and the ink tank are provided separate from and outside the main recording apparatus body;*

*an ink tube that is connected to the ink jet head and the ink tank and that supplies ink from the ink tank to the ink jet head, the ink tube being regulated by the first regulation portion;*

*a tube support member supported by the ink tank unit, the tube support member supports the ink tube, a second regulation portion located on a portion of the tube support member, the second regulation portion having with a bent-shape surface that makes contact with the ink tube and is formed so as to correspond to a predetermined angular range, wherein the first regulation portion and the second regulation portion both*

*being disposed outside of the main recording apparatus body and regulating an extension direction of the ink tube within the predetermine angular range; and*

*a guide member provided in a carriage that houses the inkjet head, the guide member bends and holds the plurality of ink tubes along a guide portion in a moving direction of the carriage.*

*12. The ink jet recording apparatus according to claim 11, further comprising a transport unit that includes a discharge roller, wherein the tube support member is disposed above the transport unit.*

*13. The ink jet recording apparatus according to claim 11, wherein the ink tube includes a U-shaped tube portion that is bent in an upward direction from the tube support member, and wherein the U-shaped tube portion is disposed at an opposite side of the ink tank.*

*14. The ink jet recording apparatus according to claim 13, further comprising a carriage unit, wherein the carriage unit includes the ink jet head, wherein a bent tube portion leads to a downstream side of the U-shaped tube portion and is bent toward the carriage unit in a horizontal plane.*

*15. The ink jet recording apparatus according to claim 14, further comprising a guide unit,*

*wherein the guide unit includes a guide member and a tube holding member,*

*wherein the guide member bends the bent tube portions to the horizontal plane and leads from the bent tube portions to the ink jet head,*

*wherein the tube holding member is provided on an upstream side of the guide member and holds the ink tube, and*

*wherein the guide member and the tube holding member are formed in the carriage unit.*

*16. The ink jet recording apparatus according to claim 15, wherein the guide member and the tube holding member are formed on a left side of the carriage unit and in a discharge direction of the carriage unit.*

*17. The ink jet recording apparatus according to claim 11, further comprising a carriage unit, wherein the tube guide is disposed so as to overlap in a height direction with a side of the carriage unit.*

* * * * *